United States Patent
Cahuzac

[19]

[11] Patent Number: 6,123,043
[45] Date of Patent: Sep. 26, 2000

[54] FIBROUS REINFORCEMENT FOR A COMPOSITE COMPONENT, AND PROCESS AND DEVICE FOR PRODUCING IT

[75] Inventor: Georges Cahuzac, Le Bouscat, France

[73] Assignee: Aerospatiale Societe Nationale Industrielle, Paris, France

[21] Appl. No.: 09/292,837

[22] Filed: Apr. 16, 1999

[30] Foreign Application Priority Data

Jun. 10, 1998 [FR] France ................................. 98 07278

[51] Int. Cl.[7] .................. D05B 3/12; B32B 7/08
[52] U.S. Cl. .................... 112/475.08; 112/440
[58] Field of Search ................ 112/440, 475.01, 112/475.08, 402, 405, 420, 470.13; 428/102, 112, 224, 225

[56] References Cited

U.S. PATENT DOCUMENTS

| | | |
|---|---|---|
| 2,283,802 | 5/1942 | Gingher . |
| 3,322,868 | 5/1967 | Kruse et al. . |
| 4,080,915 | 3/1978 | Bompard et al. . |
| 4,628,846 | 12/1986 | Vives . |
| 4,863,660 | 9/1989 | Cahuzac et al. . |
| 4,917,756 | 4/1990 | Cahuzac et al. . |
| 5,019,435 | 5/1991 | Cahuzac et al. . |
| 5,102,723 | 4/1992 | Pepin ........................ 428/102 |
| 5,350,615 | 9/1994 | Darrieux ............... 112/440 X |
| 5,429,853 | 7/1995 | Darrieux . |
| 5,466,506 | 11/1995 | Freitas et al. ............ 428/112 X |
| 5,515,798 | 5/1996 | Cahuzac . |
| 5,543,005 | 8/1996 | Monget et al. . |
| 5,642,679 | 7/1997 | Monget et al. . |

FOREIGN PATENT DOCUMENTS

| | | |
|---|---|---|
| 0284497 | 9/1988 | European Pat. Off. . |
| 0556088 | 8/1993 | European Pat. Off. . |
| 3147228 | 6/1993 | Germany . |
| 2159460 | 12/1985 | United Kingdom . |

*Primary Examiner*—Ismael Izaguirre
*Attorney, Agent, or Firm*—Fisher, Christen & Sabol

[57] ABSTRACT

The present invention relates to the production of a reinforcement for a composite component, comprising a fibrous substrate (22, 23) reinforced by a stitching thread forming stitches (27.1, 27.2; 30.1, 30.2; 33.1, 33.2 and 36.1, 36.2) passing through said substrate. According to the invention, said stitches are oblique and pass through said substrate slantwise, making an angle of inclination of at most 30°. It is advantageous for said fibrous substrate to consist of plies of crossed threads (22, 23) defining mesh cells (24) through which said stitches pass.

24 Claims, 6 Drawing Sheets

FIBROUS REINFORCEMENT FOR A COMPOSITE COMPONENT, AND PROCESS AND DEVICE FOR PRODUCING IT

The present invention relates to reinforcements composed of strong fibers distributed in three dimensions and intended for the production of composite components which are formed from said reinforcements embedded in a cured matrix. It also relates to a process and to a device for the production of such reinforcements.

A process for producing such reinforcements composed of fibers distributed in three dimensions is known, for example from United States patents U.S. Pat. No. 2,283,802, U.S. Pat. No. 3,322,868, U.S. Pat. No. 4,080,915, U.S. Pat. No. 4,863,660, U.S. Pat. No. 4,917,756, U.S. Pat. No. 5,515,798, U.S. Pat. No. 5,543,005 and U.S. Pat. No. 5,642,679. In these known techniques, a substrate of such fibers, for example fibers crossed in at least two directions, is formed and then the fibers of said substrate are bonded together by stitching, by introducing a continuous consolidating thread into said substrate by means of a needle undergoing a reciprocating motion, while a relative movement of said needle with respect to said substrate is produced so that said continuous consolidating thread forms lines of stitching, each line consisting of a series of stitches passing orthogonally through said substrate.

The use of these known composite reinforcements shows that said stitches do not give the latter a high shear strength parallel to said substrate. In addition, when said substrate is formed, as is usual, by superposed plies of fibers, said stitches are unable to prevent said plies from delaminating.

In order to explain such a limitation in the shear strength and in the delaminating resistance, the following hypotheses may be put forward:

the two strands of thread constituting each stitch are unable to work either in compression or in tension when a force parallel to the substrate is applied to said reinforcement;

the resistance of the two strands of thread of each stitch to such a force, the direction of which is transverse to them, can only be low; and the two strands of thread of each stitch separate the fibers which constitute said plies, through which said strands pass, thereby forming gaps whose width is at least equal to the diameter of said consolidating thread. Such gaps reduce the areas of contact between the plies, which in turn results in a reduction in the shear strength of the reinforcement.

The object of the present invention is to remedy these drawbacks and to be able to produce fibrous reinforcements of the type mentioned above that have a high shear strength and a high delamination resistance.

For this purpose, according to the invention, the reinforcement for a composite component, comprising a fibrous substrate reinforced by a stitching thread forming stitches passing through said substrate from an external surface of the latter, is noteworthy in that at least some of said stitches are oblique and pass through said substrate slantwise, making an angle of inclination of at most 30° with said external surface of said substrate. Preferably, said angle of inclination is at most 10°. It should be pointed out that, if said reinforcement undergoes a tamping operation after said oblique stitches have been produced, the angle of inclination of them may be even smaller after tamping.

Thus, in the fibrous reinforcement according to the present invention, the two strands of thread of each stitch are highly inclined with respect to the thickness direction of said reinforcement so that not only do they provide bonding of the fibers of the reinforcement in the thickness direction, but they also are capable of working in tension and/or in compression in the direction of the line of stitching. They therefore make it possible for said reinforcement to have a high shear strength and a high delamination resistance.

It should be pointed out that the present invention may be implemented:

whatever the nature (felt, superposed plies, etc.) of said fibrous substrate;

whatever the form (sheet, hollow body, etc.) of said fibrous substrate; and whatever the method of stitching (with or without knotting).

If said stitching thread forms at least a first array of mutually parallel first lines of stitching, which define a first direction of stitching and consist of first stitches passing through said substrate from said external surface of the latter, it is advantageous for each of said first stitches to be oblique and pass through said substrate slantwise, making a first angle of inclination of at most 30° with said external surface of said substrate.

It will be noted that, when said stitch follows an inclined zigzag path inside said reinforcement, the latter has, parallel to said first direction of stitching, the ability to deform more than one reinforcement in which said first lines of stitching are replaced with straight threads of the same direction. Thus, the reinforcement according to the invention can, if required, be applied to a shape whose surface cannot be opened out flat.

In the usual case in which said fibrous substrate comprises at least a first ply consisting of mutually parallel lengths of straight threads defining a first direction of threads, it is advantageous for said first direction of stitching to be different from said first direction of threads. In addition, if said substrate comprises at least a second additional ply, superposed on said first ply and consisting of mutually parallel lengths of straight threads defining a second direction of threads different from the first, it is also advantageous for said first direction of stitching to be also different from said second direction of threads.

In order for the shear-strength and delamination-resistance properties of the reinforcement according to the present invention to be identical in both senses of said first direction of stitching, said reinforcement may comprise a second array of mutually parallel second lines of stitching which define a second direction of stitching parallel to said first direction of stitching and are formed from second stitches passing through said substrate from said external surface of the latter, each of said second stitches being oblique and passing through said substrate slantwise, making an angle of inclination which is the opposite of that of said first stitches and making, with said external surface of the substrate, a second angle of inclination of at most 30°, said second angle being preferably symmetrical with respect to said first angle.

The reinforcement according to the present invention may comprise, in addition, a third array of mutually parallel third lines of stitching which define a third direction of stitching different from said first and second directions of threads and from said first and second directions of stitching and are formed from third oblique stitches passing through said substrate slantwise from said external surface, making with the latter a third angle of inclination of at most 30°, and preferably of at most 10° and equal to said first and second angles.

In a similar way to that described with regard to said second direction of stitching, the reinforcement according to the present invention advantageously comprises a fourth array of mutually parallel fourth lines of stitching which define a fourth direction of stitching parallel to said third direction of stitching and are formed from fourth stitches passing through said substrate from said external surface of the latter, each of said fourth stitches being oblique and passing through said substrate slantwise making an angle of inclination which is the opposite of that of said third stitches and making, with said external surface of the substrate, a fourth angle of inclination of at most 30°, said fourth angle being preferably symmetrical with respect to said third angle.

Thus, in the usual case in which said first and second directions of threads are mutually perpendicular and define, respectively, the 0° and 90° directions of said reinforcement, a reinforcement is obtained whose structure and properties are virtually isotropic by making said first, second, third and fourth directions of stitching at 45°, 225°, 135° and 315°, respectively.

Moreover, if said first and second directions of threads are mutually perpendicular and form at least approximately square mesh cells, the sides of which have a length of a, it is advantageous for said first direction of stitching to be oriented along a diagonal of said mesh cells and for the spacing of said first and second stitches to be √2a.

Said third direction of stitching may then be oriented symmetrically along the other diagonal of said mesh cells and the spacing of said third and fourth stitches may be √2a.

Thus, there is excellent interlacement of the substrate threads and of the stitching threads in the reinforcement according to the present invention.

It should be pointed out that said first, second, third and fourth stitches, being inserted obliquely between the threads of said first and second directions of threads of several superposed plies, separate said threads so that this results in a shift of the threads of the first direction of one ply with respect to the threads of the first direction of the subjacent ply and a shift of the threads of the second direction of one ply with respect to the threads of the second direction of the subjacent ply. Thus, from one ply to the subjacent ply, the threads of the first direction are arranged in a staggered fashion and the same applies to the threads of the second direction.

It will be readily understood that, if said first and second directions of threads form square mesh cells of side a, as indicated above, it is possible to adjust the stitching angle of said first, second, third and fourth stitches, as well as other parameters such as the cross section of the threads of said stitches, so that, from one ply to the next, the threads of said first and second directions are respectively offset by a/2. Thus, after stitching, said first and second directions of threads form two meshes arranged in a staggered fashion in the thickness of said reinforcement.

The present invention also relates to a device for the production of a reinforcement for a composite component from a fibrous substrate, said device being of the known type and comprising:
- a needle capable of inserting a continuous stitching thread into said substrate through an external surface of said substrate;
- means for making said needle undergo a reciprocating motion;
- means for generating a relative movement of said substrate with respect to said needle.

According to the present invention, such a device is noteworthy in that said needle is inclined with respect to said external surface of the substrate, making an angle of at most 30°, and preferably of at most 10°, with respect to the latter.

Likewise, in accordance with the invention, the process for producing a reinforcement for a composite component, comprising a fibrous substrate reinforced by a stitching thread forming lines of stitching consisting of stitches passing through said substrate from an external surface of the latter, is noteworthy in that said stitches are produced slantwise with respect to said external surface, at an angle of inclination of at most 30° and preferably of at most 10°.

The figures of the appended drawing will make it clearly understood how the invention may be realized. In these figures, identical references denote similar elements.

Figure 4:
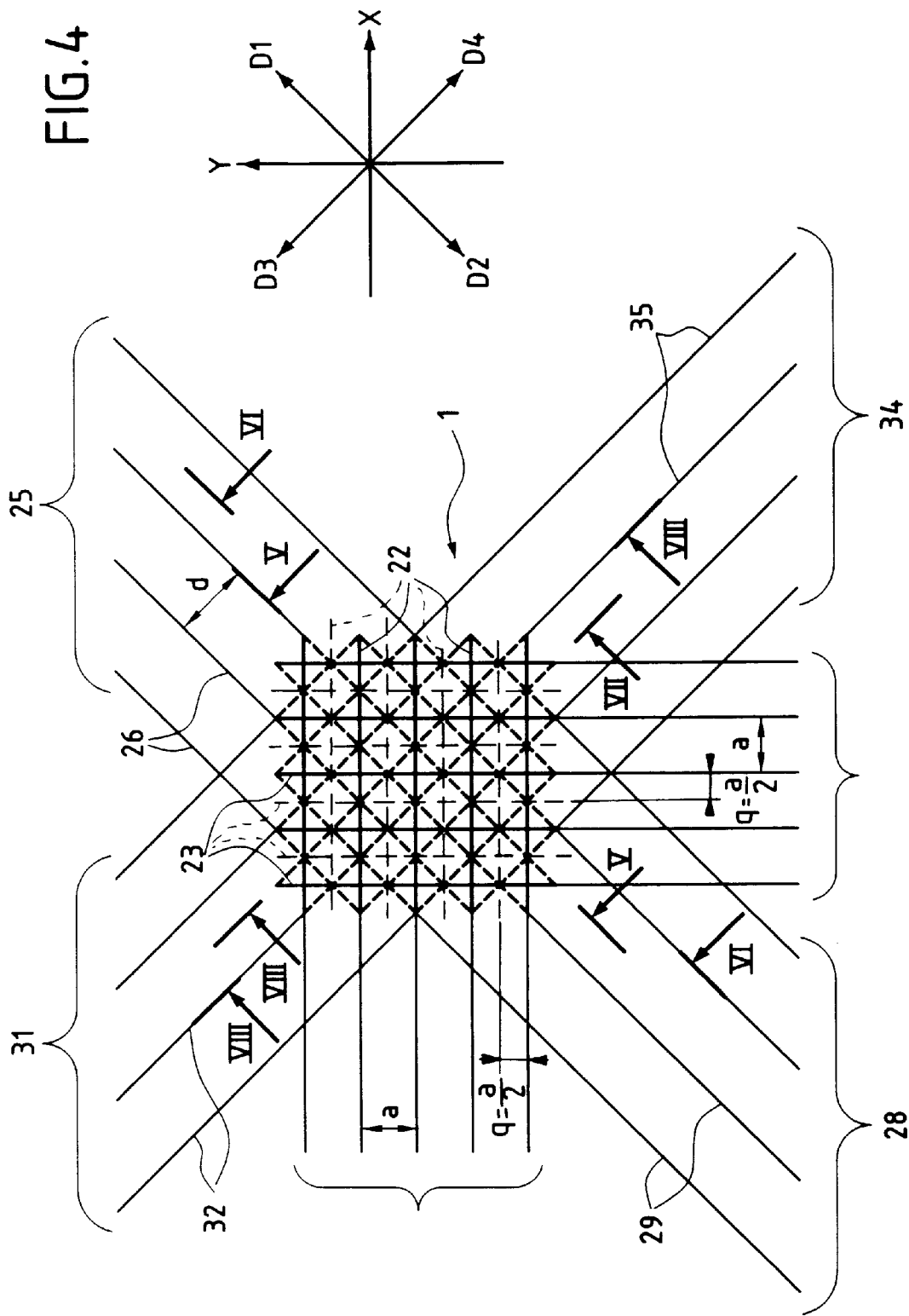
FIG. 4 shows diagrammatically, in plan view, part of an illustrative embodiment of the reinforcement according to the present invention.

FIGS. 5 to 8 correspond to enlarged cross sections, respectively on the lines V—V, VI—VI, VII—VII and VIII—VIII in FIG. 4.

Figure 9:
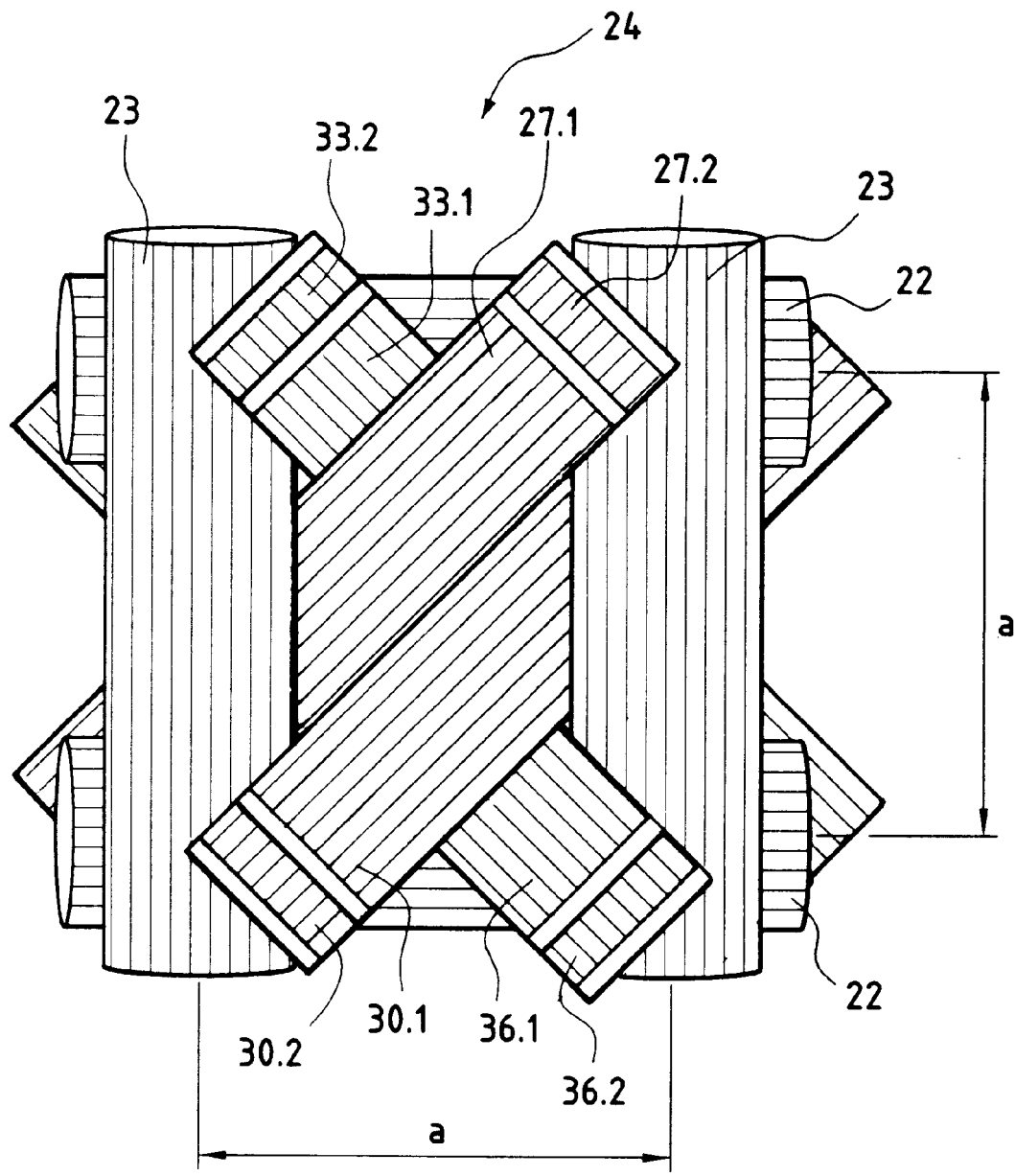

FIG. 9 is a diagrammatic plan view of a mesh cell of the illustrative embodiment of the reinforcement in FIGS. 4 to 8.

Figure 10:
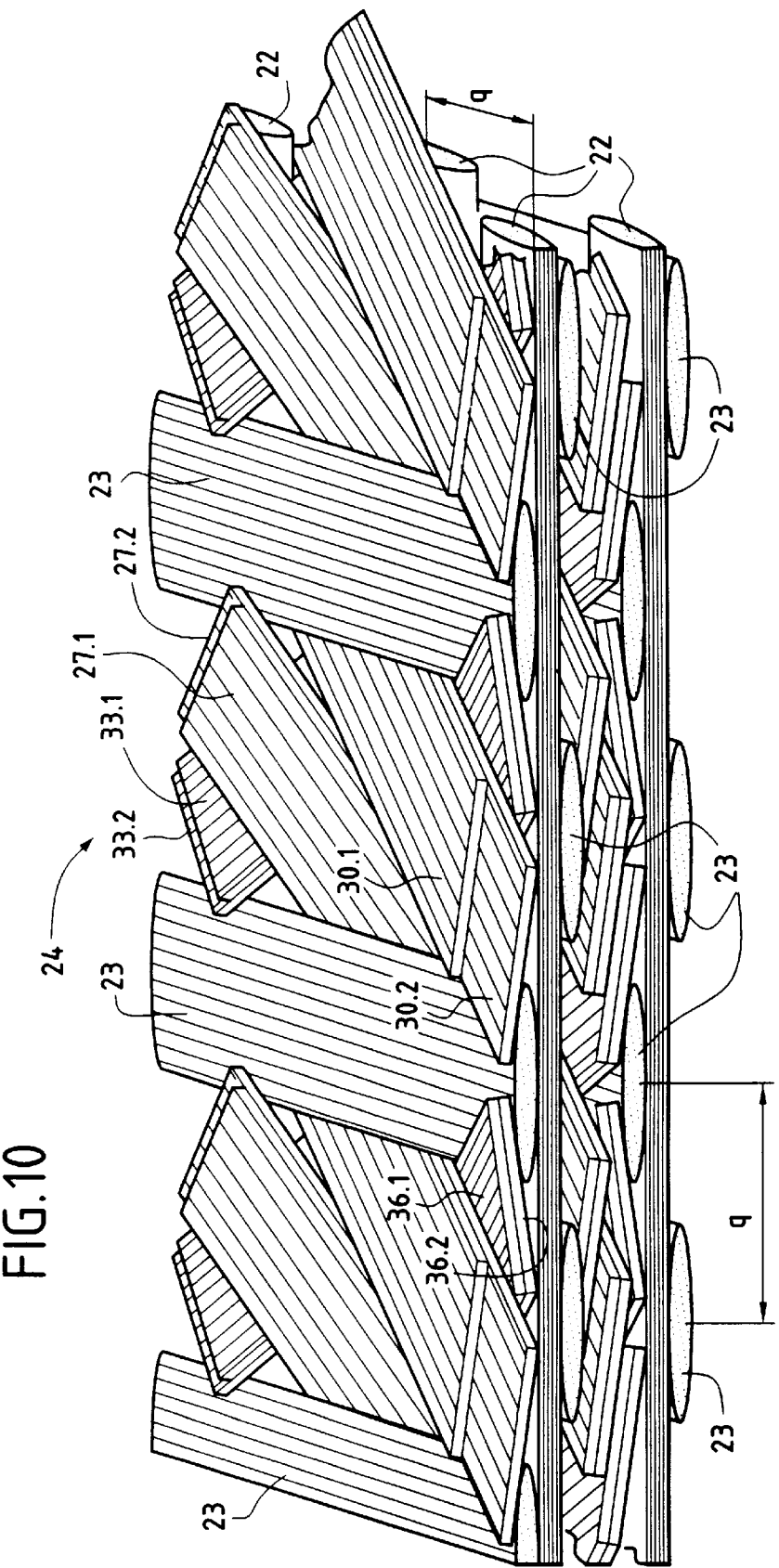

FIG. 10 shows, in diagrammatic perspective and in cross section, a portion of the reinforcement corresponding to the mesh cell in FIG. 9.

Figure 1:
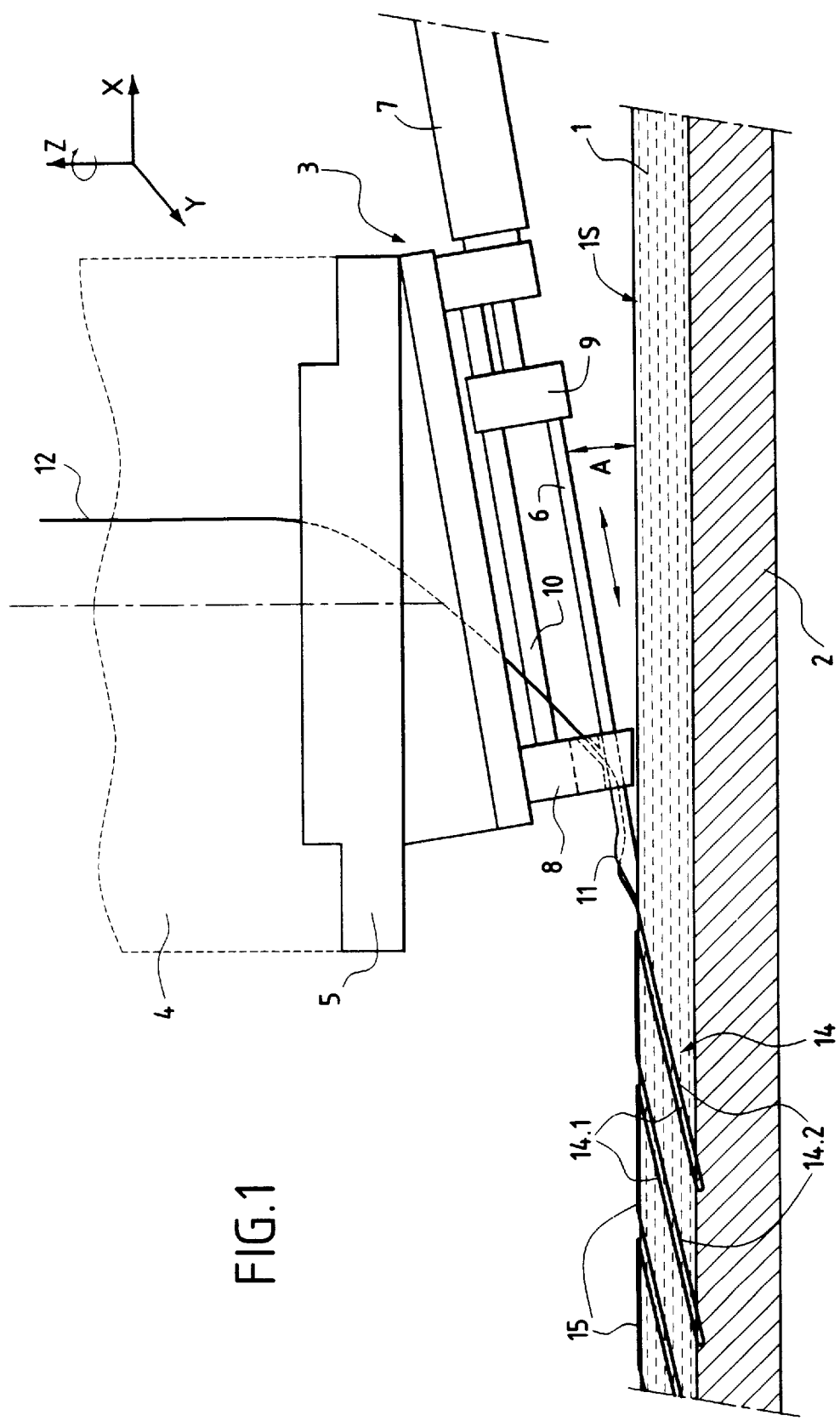
FIG. 1 is a diagrammatic side view illustrating the process and the device according to the present invention.

FIG. 1 shows a fibrous substrate 1 resting on a support 2, as well as a stitching tool 3 intended to insert stitches into said fibrous substrate 1.

The stitching tool 3 is, for example, mounted on an arm 4 capable of moving, in a known manner which has not been shown in detail, along two mutually perpendicular directions X and Y which are parallel to said support 2 and along a direction Z orthogonal to the latter, as well as capable of rotating about this latter direction Z. The stitching tool 3 has a base 5 which allows the tool to be connected to the arm 4 and fitted onto said base 5 is a stitching needle 6 capable of being made to undergo a reciprocating stitching motion by an actuator 7, for example a pneumatic actuator. The stitching needle 6 is guided translationally by a fixed guide 8, through which said needle passes, and is fastened at its blunt end to a slide 9 which is actuated by the actuator 7 and is guided slidingly by guides 10. The tool is inclined with respect to the support 2 so that the stitching needle 6 is inclined at an angle A of at most 30°, but preferably of about 10°, with respect to the external surface 1S of said fibrous substrate 1.

Figure 2:
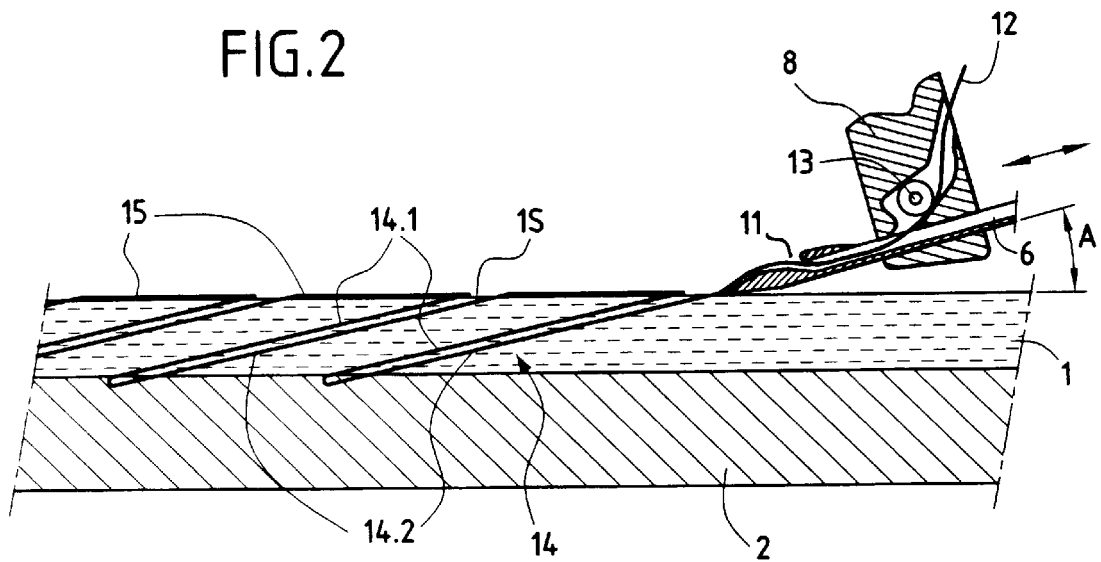
FIG. 2 is a partial cross section of the tool in FIG. 1.

As shown in greater detail in FIG. 2, the inclined stitching needle 6 is hollow and/or has a lateral eye 11 and is supplied with stitching thread 12 via a controllable thread holder 13, for example housed in the guide 8. Thus, said stitching needle 6 with said thread 12 can form stitches 14 in said fibrous substrate 1, each stitch consisting of two strands of thread 14.1 and 14.2 which are approximately parallel to each other but inclined to said substrate 1 at the angle A. The oblique stitches 14 pass right through said substrate 1, slantwise with respect to the thickness of the latter, and are linked together by strands of thread 15 in order to form lines of stitching. The stitches 14, although shown in FIGS. 1 and 2 as being of the type without knotting (the pointed end of the needle 6 then penetrating the support 2), could of course be of any other type, as long as the support 2 lends itself thereto.

It will also be understood that the tool 3, since it can move parallel to the X, Y and Z directions and rotate about the Z direction, can form lines of stitching of any desired shape and orientation in the fibrous substrate 1.

Figure 3:
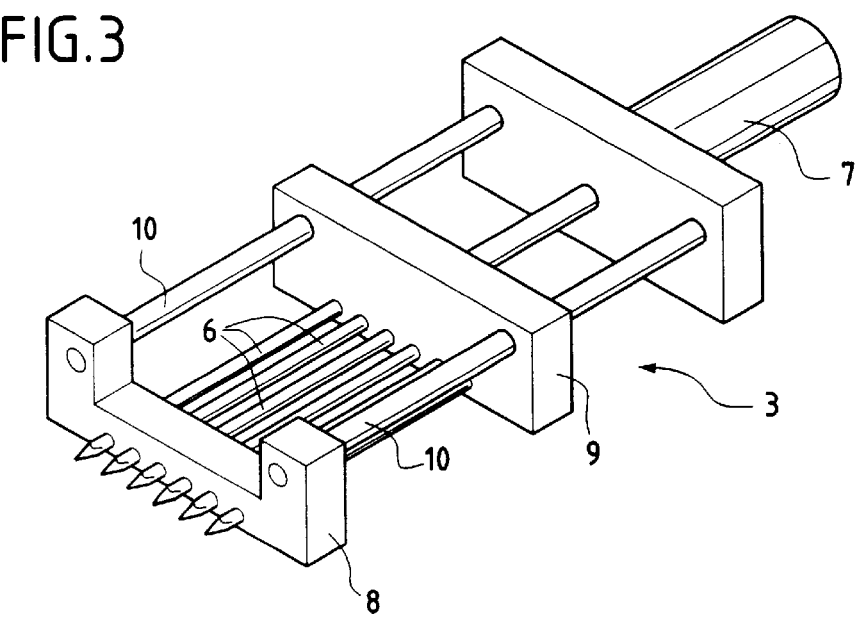
FIG. 3 shows an alternative embodiment of the tool in FIGS. 1 and 2.

FIG. 3 shows that, optionally, the tool 3 may have a plurality of needles 6, actuating simultaneously.

In the illustrative embodiment of the fibrous reinforcement according to the present invention and shown in FIGS. 4 to 9, it has been assumed that said substrate 1 is formed by the superposition of plies 20 and 21. The plies 20 consist of lengths of straight threads 22 which are mutually parallel and parallel to the X direction chosen as the 0° direction, whereas the plies 21 consist of lengths of straight threads 23 which are mutually parallel and parallel to the Y direction, perpendicular to the X direction and therefore defining the 90° direction. The lengths of threads 22 and 23 initially form between them a mesh consisting of mesh cells 24 having, for example, a square shape of side equal to a.

Figure 5:
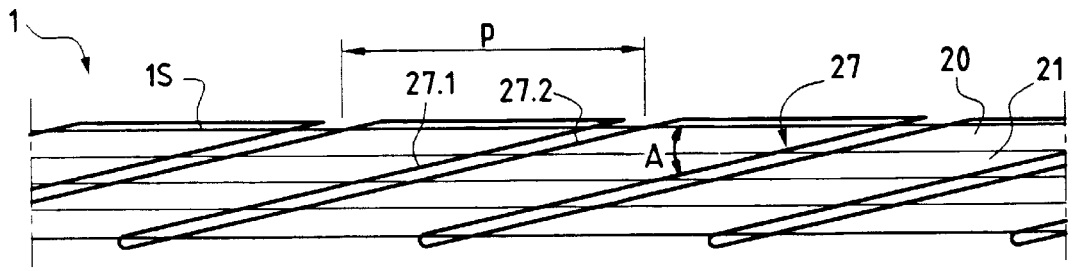
Figure 6:
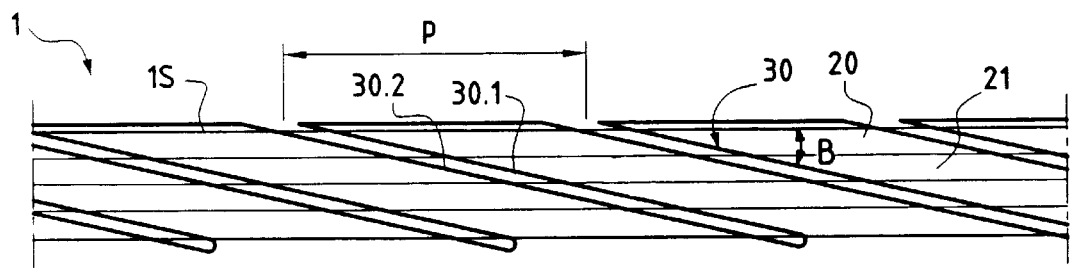
Figure 7:
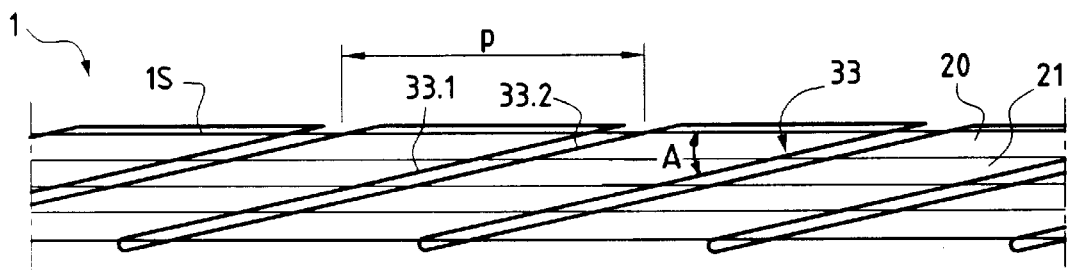
Figure 8:
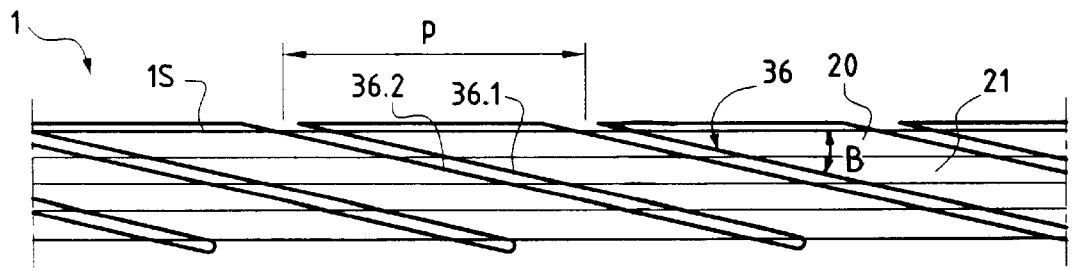

In the manner described above with regard to FIGS. 1 and 2, the fibrous substrate 1 in FIGS. 4 to 9 is reinforced by the stitching thread 12 which forms:

a first array 25 of mutually parallel lines of stitching 26 which define the 450 direction of stitching D1 and which consist of oblique stitches 27 (similar to the stitches 14) passing right through the substrate 1, from the external surface 1S of the latter, said stitches 27 consisting of strands 27.1 and 27.2 making an angle of inclination A to said external surface 1S of at most 30° and preferably of at most 10° (see FIG. 5). The spacing p of the stitches 27 is equal to $\sqrt{2}a$ and the distance d between two lines of stitching 26 is also equal to $\sqrt{2}a$;

a second array 28 of mutually parallel lines of stitching 29, which define the 225° direction of stitching D2 and which consist of oblique stitches 30 (similar to the stitches 14), passing right through the substrate 1, from the external surface 1S of the latter, said stitches 30 consisting of strands 30.1 and 30.2 making an angle of inclination B (equal to A, but symmetrical with respect to the latter) to said external surface 1S of at most 30° and preferably of at most 10° (see FIG. 6). The spacing p of the stitches 30 is equal to $\sqrt{2}a$ and the distance d between two lines of stitching 29 is also equal to $\sqrt{2}a$;

a third array 31 of mutually parallel lines of stitching 32, which define the 135° direction of stitching D3 and which consist of oblique stitches 33 (similar to the stitches 14), passing right through the substrate 1, from the external surface 1S of the latter, said stitches 33 consisting of strands 33.1 and 33.2 making an angle of inclination A to said external surface 1S of at most 30° and preferably of at most 10° (see FIG. 7). The spacing p of the stitches 33 is equal to $\sqrt{2}a$ and the distance d between two lines of stitching 32 is also equal to $\sqrt{2}a$; and a fourth array 34 of mutually parallel lines of stitching 35, which define the 315° direction of stitching D4 and which consist of oblique stitches 36 (similar to the stitches 14), passing right through the substrate 1, from the external surface 1S of the latter, said stitches 36 consisting of strands 36.1 and 36.2 making an angle of inclination B (like that above) to said external surface 1S of at most 30° and preferably of at most 10° (see FIG. 8). The spacing p of the stitches 36 is equal to $\sqrt{2}a$ and the distance d between two lines of stitching 33 is also equal to $\sqrt{2}a$.

For the sake of clarity, the lengths of threads 22 and 23 and the lines of stitching 25, 28, 31 and 34 in FIG. 4 are shown separated from one another. In reality, the reinforcement in FIG. 4 is in the form like that shown, more realistically, in FIGS. 9 and 10.

It should be pointed out that:

if the reinforcement 1 is tamped, the oblique stitches 27, 30, 33 and 36 have, after tamping, an angle of inclination which is less than their angle of insertion A or B;

the reinforcement 1 in FIGS. 4 to 9 forms a three-dimensional reinforcement having 6 directions of threads 22, 23, 25, 28, 31 and 34, which is flexible and can be applied to a support of shape that cannot be opened out flat, because of the flexibility of the directions 25, 28, 31 and 34 formed by inclined stitches;

the strands of thread 27.1 and 27.2, 30.1 and 30.2, 33.1 and 33.2 and 36.1 and 36.2 of the respective stitches 27, 30, 33 and 36 are inserted between the threads 22 and the threads 23 of the different superposed plies 20 and 21, separating said threads 22 and 23 so that, after stitching (as may be seen in FIG. 10), the threads 22 of two consecutive plies 20 are arranged in a staggered fashion and the threads 23 of two consecutive plies 21 are also arranged in a staggered fashion. The offset q between the threads 22 (or 23) of two adjacent plies 20 (or 21) may be set so as to be equal to a/2, as is illustrated in FIG. 4.

What is claimed is:

1. A reinforcement for a composite component, comprising a fibrous substrate (1) reinforced by a stitching thread (12) forming stitches (14, 27, 30, 33, 36) passing through said substrate from an external surface (1S) of the latter, wherein at least some of said stitches (14, 27, 30, 33, 36) are oblique and pass through said substrate (1) slantwise, making an angle of inclination (A, B) of at most 30° with said external surface (1S) of said substrate (1).

2. The reinforcement as claimed in claim 1, wherein said angle of inclination is at most 10°.

3. The reinforcement as claimed in claim 1, in which said stitching thread (12) forms at least a first array (25) of first mutually parallel lines of stitching (26), which define a first direction of stitching (D1) and consist of first stitches (27) passing through said substrate from said external surface (1S) of the latter, wherein each of said first stitches (27) is oblique and passes through said substrate (1) slantwise, making a first angle of inclination (A) of at most 30° with said external surface (1S) of said substrate (1).

4. The reinforcement as claimed in claim 3, in which said fibrous substrate (1) comprises at least a first ply (20) consisting of mutually parallel lengths of straight threads (22) defining a first direction of threads (X), wherein said first direction of stitching (D1) is different from said first direction of threads (X).

5. The reinforcement as claimed in claim 4, in which said fibrous substrate (1) comprises, in addition, at least a second ply (21), superposed on said first ply (20) and consisting of mutually parallel lengths of straight threads (23) defining a second direction of threads (Y), wherein said first direction of stitching (D1) is also different from said second direction of threads (Y).

6. The reinforcement as claimed in claim 3, which comprises:

a second array (28) of mutually parallel second lines of stitching (29) which define a second direction of stitching (D2) parallel to said first direction of stitching (D1) and are formed from second stitches (30) passing through said substrate (1) from said external surface (1S) of the latter; and each of said second stitches (30) is oblique and passes through said substrate (1) slantwise, making an angle of inclination which is the opposite of that of said first stitches and making, with said external surface of the substrate (1), a second angle of inclination (B) of at most 30°.

7. The reinforcement as claimed in claim 6, wherein the said second angle of inclination (B) is symmetrical with respect to said first angle of inclination (A).

8. The reinforcement as claimed in claim 4, which comprises a third array (31) of mutually parallel third lines of stitching (32) which define a third direction of stitching (D3) different from said first and second directions of threads (X, Y) and from said first and second directions of stitching (D1, D2) and are formed from third oblique stitches (33) passing through said substrate (1) slantwise from said external surface (1S), making with the latter a third angle of inclination (A) of at most 30°.

9. The reinforcement as claimed in claim 8, wherein the value of said third angle of inclination is equal to that of said first and second angles.

10. The reinforcement as claimed in claim 8, which comprises:
- a fourth array (31) of mutually parallel fourth lines of stitching (32) which define a fourth direction of stitching (D4) parallel to said third direction of stitching (D3) and are formed from fourth stitches (36) passing through said substrate (1) from said external surface (1S) of the latter; and
- each of said fourth stitches (36) is oblique and passes through said substrate (1) slantwise, making an angle of inclination which is the opposite of that of said third stitches (33) and making, with said external surface (1S) of the substrate (1), a fourth angle of inclination (B) of at most 30°.

11. The reinforcement as claimed in claim 10, wherein said fourth angle of inclination (B) is symmetrical with respect to said third angle of inclination (A).

12. The reinforcement as claimed in claim 10, in which said first and second directions of threads (X, Y) are mutually perpendicular and define, respectively, the 0° and 90° directions of said reinforcement, wherein said first, second, third and fourth directions of stitching (D1, D2, D3 and D4) are at 45°, 225°, 135° and 315°, respectively.

13. The reinforcement as claimed in claim 4, in which said first and second directions of threads (X, Y) are mutually perpendicular and form at least approximately square mesh cells (24), the sides of which have a length of a, wherein said first direction of stitching (D1) is oriented along a diagonal of said mesh cells (24) and wherein the spacing of said first stitches (27) is $\sqrt{2}a$.

14. The reinforcement as claimed in claim 6, in which said first and second directions of threads (X, Y) are mutually perpendicular and form at least approximately square mesh cells (24), the sides of which have a length of a, wherein the spacing of said second stitches (30) is $\sqrt{2}a$.

15. The reinforcement as claimed in claim 8, in which said first and second directions of threads (X, Y) are mutually perpendicular and form at least approximately square mesh cells (24), the sides of which have a length of a, wherein said third direction of stitching (D3) is oriented along the other diagonal of said mesh cells (24) and wherein the spacing of said third stitches (33) is $\sqrt{2}a$.

16. The reinforcement as claimed in claim 10, in which said first and second directions of threads (X, Y) are mutually perpendicular and form at least approximately square mesh cells (24), the sides of which have a length of a, wherein the spacing of said fourth stitches (36) is $\sqrt{2}a$.

17. The reinforcement as claimed in claim 5, wherein said first plies (20) and said second plies (21) define mesh cells (24) through which said stitches (14, 27, 30, 33, 36) pass.

18. The reinforcement as claimed in claim 17, which comprises, after stitching, two meshes consisting of mesh cells (24) arranged alternately in a staggered fashion, having a stagger offset (9), in the thickness of said reinforcement.

19. The reinforcement as claimed in claim 18, wherein said stagger offset (q) of the two meshes is at least approximately equal to half of the side (a) of said mesh cells (24).

20. A process for producing a reinforcement for a composite component, comprising a fibrous substrate (1) reinforced by a stitching thread (12) forming lines of stitching consisting of stitches passing through said substrate from an external surface of the latter, wherein said stitches (27, 30, 33, 36) are produced slantwise with respect to said external surface, at an angle of inclination (A, B) of at most 30°.

21. The process as claimed in claim 20, wherein said angle of inclination is at most 10°.

22. A device for the production of a reinforcement for a composite component from a fibrous substrate (1), said device comprising:
- a needle (6) capable of inserting a continuous stitching thread (12) into said substrate (1) through an external surface (1S) of said substrate;
- means (7) for making said needle (6) undergo a reciprocating motion along its longitudinal axis; and
- means (4) for generating a relative movement of said substrate with respect to said needle, wherein said needle (6) is inclined with respect to said external surface (1S) of the substrate (1), making an angle (A, B) of at most 30° with respect to the latter.

23. The device as claimed in claim 22, wherein said angle is at most 10°.

24. The device as claimed in claim 22, which comprises several needles (6) arranged so as to be parallel to one another and actuated together by said actuating means (7).

* * * * *